(No Model.)

C. SCHLEICHER.
CAR COUPLING.

No. 466,967. Patented Jan. 12, 1892.

Witnesses:
Joseph H. Buerk
Bert R. Huncilman

Inventor:
Charles Schleicher
Per H. A. Buerk
his attorney

UNITED STATES PATENT OFFICE.

CHARLES SCHLEICHER, OF LOUISVILLE, KENTUCKY.

CAR-COUPLING.

SPECIFICATION forming part of Letters Patent No. 466,967, dated January 12, 1892.

Application filed July 30, 1891. Serial No. 401,233. (No model.)

*To all whom it may concern:*

Be it known that I, CHARLES SCHLEICHER, a citizen of the United States, residing at Louisville, county of Jefferson, and State of Kentucky, have invented a new and useful Improvement in Automatic Car-Couplings, set forth in the following specification.

My invention relates to automatic car-couplings, and is adapted to act as a hinge-joint and pin-support to all couplers provided with a laterally-swinging hook, it being in the form of a hollow cylindrical piece with a rim or offset at one end and keys at the other, so arranged as not to interfere with the hollow center.

My invention is fully shown in the accompanying drawings.

Figure 1:
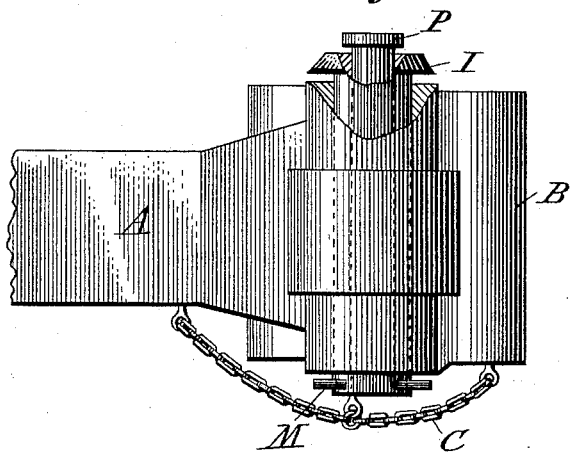
Figure 2:
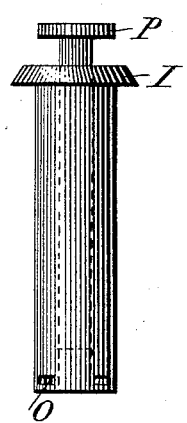

Figure 1 is a rear elevation of a coupling involving my invention. Fig. 2 is a side view of my invention, showing the cylindrical piece, the key-seats, and the solid pin.

I use the cylindrical piece because, owing to its lightness and strength, it is best adapted to act as the holding-piece for a hook. The keys are inserted in such a manner as not to interfere or be in the space within the hollow pin I, at the same time acting against the lower surface of the coupler. The seats O are provided for their reception. The pin P is solid and reinforces the cylindrical pin I, or may be used to make an ordinary coupling with a draw-bar provided with a link connection.

The cylindrical pin, besides its lightness and strength, has the ready adaptability to removal necessary when the hook is to be removed for repairs or substitution.

Having thus described my invention, what I claim as my own, and desire to secure by Letters Patent, is—

In an automatic car-coupling, the hollow pin I, provided with a supporting-rim at one end and at the other with one or more keys placed transversely through the hollow pin, but not entering the space within, the hollow pin likewise supporting a solid pin P, all substantially as described.

CHARLES SCHLEICHER.

In presence of—
CHAS. STILGER,
GEO. STILGER.